US010831569B1

(12) United States Patent
Thallapragada et al.

(10) Patent No.: US 10,831,569 B1
(45) Date of Patent: Nov. 10, 2020

(54) TRIGGER BASED NOTIFICATION GENERATION SYSTEM

(71) Applicant: Microsoft Technology Licensing, LLC, Redmond, WA (US)

(72) Inventors: Sowmitra Thallapragada, Fremont, CA (US); Shubhanshu Nagar, Mountain View, CA (US); Guanchao Wang, Foster City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/555,580

(22) Filed: Aug. 29, 2019

(51) Int. Cl.
G06F 9/54 (2006.01)
G06F 16/25 (2019.01)

(52) U.S. Cl.
CPC ............ G06F 9/542 (2013.01); G06F 16/258 (2019.01)

(58) Field of Classification Search
CPC ...................................................... G06F 9/542
USPC .......................................................... 719/318
See application file for complete search history.

(56) References Cited

U.S. PATENT DOCUMENTS

2017/0250857 A1\* 8/2017 McCullough ....... H04L 67/1097
2019/0317835 A1\* 10/2019 French ................ G06F 16/2477

\* cited by examiner

*Primary Examiner* — Andy Ho
(74) *Attorney, Agent, or Firm* — Hickman Palermo Becker Bingham LLP (57) ABSTRACT

Technologies for generating notification messages from data provided from different data sources in different data formats are provided. The disclosed techniques include a blender service that receives, from a first source, first data that is in a first data format and generates, based on the first data, a first event that includes content from the first data. The blender service also receives, from a second data source, second data that is in a second data format and generates a second event that includes content from the second data. An event processing system receives the first and second events and causes notifications to be generated based on the first event and the second event. A notification system generates the notification messages and sends the notification messages to the recipient users.

14 Claims, 5 Drawing Sheets

TRIGGER BASED NOTIFICATION GENERATION SYSTEM

TECHNICAL FIELD

The present disclosure relates to generating multiple types of notification content, for delivery to users, based on multiple triggers provided by multiple different data sources.

BACKGROUND

Content management systems are designed to provide content items to users for consumption. Content items may represent content such as photos, video, job posts, news articles, documents, user posts, audio, and many more. Content management systems may implement notification systems to generate and send notifications to recipients informing the recipients of relevant content available for consumption. Relevant content may include pending content items within a user's content item feed or events related to other users, topics, companies, groups, or any topic in which a user receiving the notification may be interested. For example, notifications may inform users of new articles about a followed hashtag, a job posting published by another user, a company of interest that initiated a fundraising event, an article talking about a company's upcoming Initial Public Offering (IPO), or any other event.

A content management system may detect relevant events from one or more external sources, such as a Reuters business news feed, and generate notifications for users that have expressed interest in the subject matter of the detected relevant events. For instance, if company A announces a new funding round, then the content management system may detect a news article about company A's new funding round and generate notifications for users that follow company A. However, the process of detecting relevant events from external data sources, such as a business news feed, is dependent on the content management system knowing how to retrieve/receive event information from the external data sources, parse the relevant data, and generate relevant notification content for interested users. Many conventional content management systems are manually configured with customized logic to handle the specific data formats of the external data sources. As more and more external data sources are used for relevant content, the customized logic within the content management system needs to be updated to handle new data formats. The process of customizing logic within the content management system may become more and more cumbersome and may lead to implementation bottlenecks when trying to incorporate new data sources.

Additionally, the content management system may implement various different types of notification services to handle different types of notifications. For example, notifications that inform users of milestone events for friends, such as birthdays and work anniversaries, may be implemented by one type of notification service, while another notification service may implement real-time notifications for timely notifications related to time-sensitive news reports. Different notification services may implement different types of request formats, which may require the content management system to further customize notification event formats to comply with the different notification services. Incorporating multiple different notification services and multiple different data sources require a significant amount of resources to ensure proper handling of the relevant notification content.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a content management system implements a blender system, an event processing system, and a notification system to receive data, from various data sources in different data formats, and generate notification messages for users based on the received data. The notification messages generated may be delivered using different delivery protocols depending on delivery time expectations provided by the various data sources. In an embodiment, a first blender service receives first data, from a first source, that is in a first data format. The first data format may represent an external data format defined by the first data source. The first blender service generates, based on the first data, a first event that includes content from the first data. The first event represents an event message that contains the first data that has been formatted to conform with a unified event format that may be used to generate notification message requests for the notification system. A blender service, which may be the first blender service or another blender service, receives second data, from a second data source, that is in a second data format, the second data format is a different format than the first data format. The blender service generates a second event that includes content from the second data. The second event represents an event message that contains the second data formatted to the unified event format.

In an embodiment, the event processing system causes notifications to be generated based on the first event and the second event. For example, the event processing system may send requests for notification messages based on the first and second events to the notification system. The notification system generates the notification messages and sends the notification messages to the recipient users.

In another embodiment, online notification messages may be generated by the blender service receiving first data, from a first data source, that is in a first data format. The blender service converts the first data into a third data format that is different from the first data format. The third data format represents a data format that is compatible with the notification system. The third data format may contain elements and input parameters that are needed by the notification system to generate the requested online notification messages. The blender service sends the converted first data to the notification system. The notification system then generates a first plurality of notifications based on the first converted data.

The blender system receives second data, from a second data source, that is in a second data format, which is different from the first data format and the third data format. The blender service converts the second data into the third data format. The blender service sends the converted second data to the notification system. The notification system then generates a second plurality of notifications based on the second converted data.

The disclosed approaches provide advantages over conventional solutions by providing a standardized intake framework that implements a unified event format for various different data sources and generates notification content for multiple different notification generation services. The standardized intake framework reduces the need for manual customization of data schemas for reading and extracting relevant data values from external data sources. The standardized intake framework provides an easily extendable schema that is able to process data values in different data formats in order to generate standardized data objects that are used to generate notification content. The notification content generated is compatible with the multiple different notification generation services, thereby reducing the overall processing and customization overhead associated with individually customizing data schemas for reading and extracting relevant data values from external data sources.

System Overview

Figure 1:
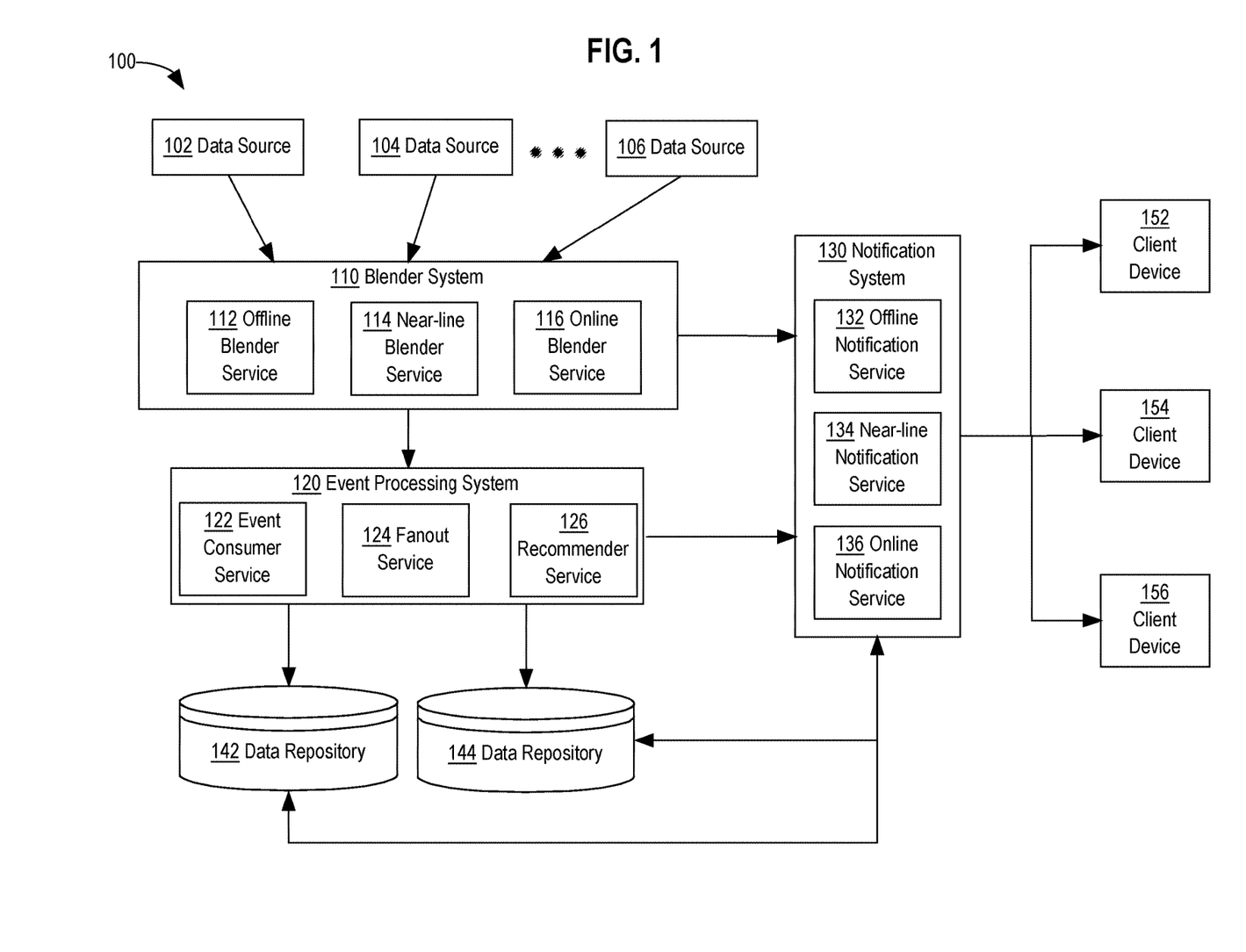
FIG. 1 is a block diagram that depicts system for generating notification content from information identified from different data sources that implement different data formats, in an embodiment.

FIG. 1 is a block diagram that depicts system 100 for generating notification content from information identified from different data sources that implement different data formats. System 100 may represent a content management platform that includes data sources 102-106, a blender system 110, an event processing system 120, a notification system 130, data repositories 142-144, and client devices 152-156. Although a single content management platform is depicted, system 100 may include additional content management platforms. Similarly, system 100 may include additional notification systems and additional client devices.

In an embodiment, the content management platform may be implemented using one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to content items and/or provide the content items to the user. For example, the content management platform may allow a user to consume, upload, search for, approve of (e.g. "like"), dislike, and/or comment on content items.

Examples of content items include, but are not limited to, messages, articles, media such as pictures, video, and sound clips, invitations to connect, and any other event or object that may be consumed by a user. A user session may refer to a period of activity between when a user logs into the content platform and the user logs out of the content platform. For example, Jane Smith may initiate a user session by logging into the content platform. Jane Smith may visit several pages, and then end her user session by logging out or by not interacting with the content platform for a period of time.

Data Sources

In an embodiment, data sources 102, 104, and 106 each represent data providers that provide trigger messages to the blender system 110 for generating trigger events. The data providers may be remote relative to the party or entity that provides blender system 110, event processing system 120, and notification system 130. For example, data source 102 may represent a business news website that generates a news alerts containing relevant content about news related to business. News alerts may be characterized as triggers that cause messages to be generated and sent to the blender system 110. A trigger may be caused by events related to a specific company, influential persons, industries, sectors, or government policy changes that effect companies of interest. For example, a trigger may occur when data source 102 (business website) publishes a news article or a statement about company A, such as company A is starting a new funding round, or company A received FDA approval for their latest drug medicine.

Data sources 102, 104, and 106 are not limited to business news websites. In other examples, data sources 102, 104, and 106 may represent content feeds or websites that provide information about entertainment news, celebrity gossip, technology topics, educational topics, or any other subject that users are interested in consuming.

Trigger messages generated in response to a trigger at one of the data sources 102, 104, and 106 may have a data source-specific format. For example, data source 102 may provide trigger messages in one specific format, while trigger messages from data source 104 may have a different format. Formats for the trigger messages may be specific to the type of trigger. For example, a news of an IPO trigger, which represents a news alert about a company's upcoming IPO, may contain elements defining an initial IPO price, the IPO data, the company name, and detailed content that contains additional information about the IPO. In another example, a funding trigger, which represents a news alert about a company's funding round, may contain elements defining the amount of money raised, the funding date, the funding type, and a link to the website URL.

In an embodiment, the data source 102, 104, and 106 may provide schema definitions for the different format types of the trigger messages. For instance, each type of trigger message provided by data source 102 may have its own schema definition file that describes each element within the trigger messages. The schema definitions may also define a trigger type for each trigger message that defines the preferred notification delivery method, the service-level agreement (SLA) for delivery, and/or the type of target users. The preferred notification delivery method specifies whether a notification message should be delivered in real-time, near real-time, or on a delayed basis. Real-time notification, herein referred to as online notification, refers to immediate delivery of a notification message to target users. Near real-time, herein referred to as near-line notification, refers to almost immediate delivery such as notification delivery that occurs soon after the trigger. Delayed notification, herein referred to as offline notification, refers to a delayed delivery of a notification message, such as waiting one day, one week, or any specified period of time. Examples of offline notifications are scheduled notifications such as birthday notifications, work anniversaries, and so on. Schema definitions may be sent to or retrieved by the blender system 110.

The SLA may specify any agreed upon delivery conditions between the data source 102 and the content management system. The SLA values may be extracted by the blender system 110 and used to determine how to route incoming trigger messages. In an embodiment, the SLA may include the preferred notification delivery method as well as back-up delivery method if the preferred delivery method is unavailable. The SLA values may also include a description of intended target users, such as specifying attributes associated with the type of target users. If the SLA includes the preferred delivery method and the type of target users, then the schema definition files may not need to include specific elements for the preferred delivery method and type of target user, as this information is part of the SLA element.

In an embodiment, the type of target users specified within the schema definition files may identify specific attributes of target users. For example, the type of target user element may specify that users who are currently employed at company A are to receive the notification message. Additionally, the type of target user element may specify different sets of target users. For example, employees of company A may be one set of target users while users who follow company A may be another set of target users. The preferred delivery method element in the schema definitions file may specify multiple preferred delivery methods for different sets of target users. For instance, employees of company A may receive near-line notification messages, while users who follow company A may receive offline notification messages.

Blender System

In an embodiment, the blender system 110 receives trigger messages from data sources 102, 104, and 106 and formats data from the trigger messages to generate trigger events that contain data formatted into a unified event format for consumption by the event processing system 120. In an embodiment, the data in the trigger event is formatted based on a unified event format. The unified event format is a schema that includes standardized elements configured for various different notification types. For example, the unified event format may have elements for celebration notification message types, such as birthdays and work anniversaries. The elements used in the celebration notification message type may include, but are not limited to, name of user, anniversary number value, type of anniversary such as birthday or work anniversary, and company. In another example, the unified event format may have elements for an affiliation notification message type, which may include business events or group events, such as IPOs, funding events, press releases, and so on. The elements used in the affiliation notification message type may include, but are not limited to, funding type, money raised, press release, source article, and so on.

In an embodiment, the unified event format may include configurable data elements that allow for different object types to be stored. This is beneficial when incorporating new trigger messages from different data sources. Without having configurable data elements, each time a new trigger message is incorporated that has elements not previously defined in the unified event format, the unified event format would need to be updated. Updating the unified event format each time a new element type is introduced may increase processing time and configuration time based upon having to update and release a new unified event format schema. An "AnyRecord" element may represent a configurable data element, where the AnyRecord element has a "type" field and a "value" field. The type field may store the name of the value field's schema, for instance, a data message object class name. The value field stores a representation of the element's value, such as the actual Javascript Object Notation (JSON) data message object. The AnyRecord element is located in a Union type field in the unified event schema. When a new element from a new trigger message is received, the new element would be stored within the AnyRecord element, within the Union field, where the type field within the AnyRecord contains the type of the new element. The value of the new element may then be dynamically resolved using the type field, within the AnyRecord, to define the object type of the value.

In an embodiment, the blender system 110 may request, from data sources 102-106, a schema definition file that defines each of the elements within a specific trigger message. The schema definition files are used to determine how to format data from the incoming trigger messages to conform with the unified event format. For example, the blender system 110 may change names of elements to conform with the defined elements in the unified event format.

In an embodiment, the blender system 100 comprises an offline blender service 112, a near-line blender service 114, and an online blender service 116. The blender system 100 may implement a unified event transformation job interface that implements functions for transforming data from incoming trigger messages into trigger events that have elements formatted to conform with the unified event format. The offline blender service 112, near-line blender service 114, and online blender service 116 may implement data source specific transformation jobs that implement functions from the unified event transformation job interface.

Offline Blender Service

Figure 2:
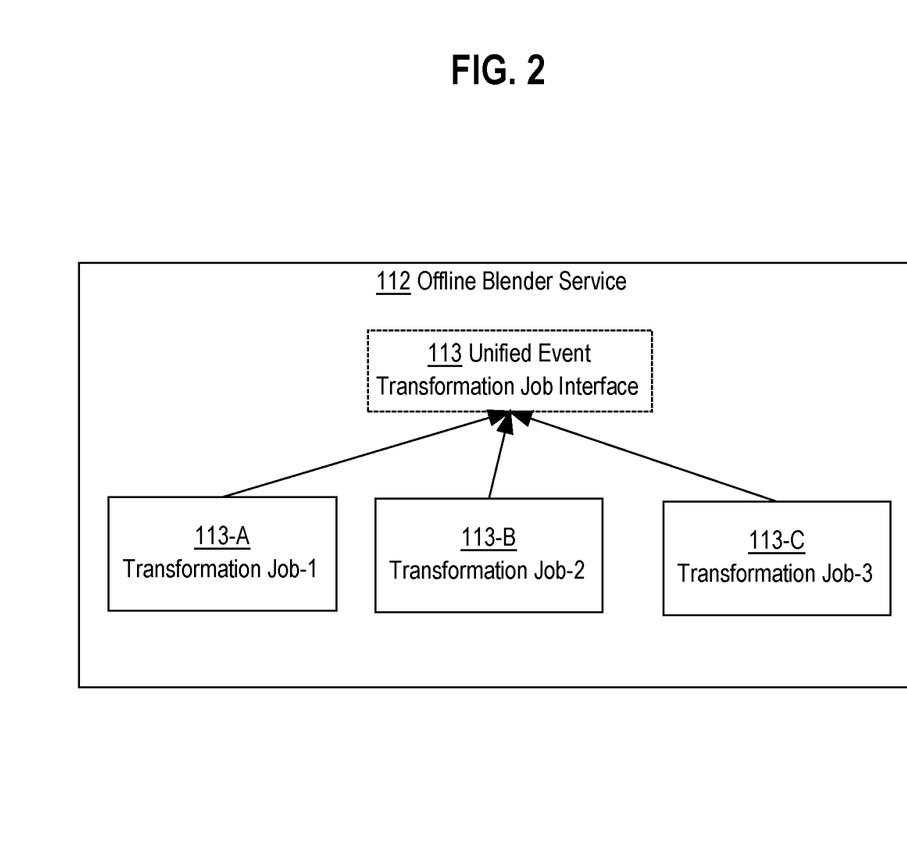
FIG. 2 depicts example transformation job service, within a blender service, that have been implemented from the unified event transformation job interface, in an embodiment.

The offline blender service 112 may implement logic to receive, from data sources 102-106, trigger messages that have been identified as having a preferred delivery method, as offline notification. In an embodiment, the offline blender service 112 implements one or more customized transformation jobs specific to incoming trigger messages from data sources 102-106. FIG. 2 depicts example transformation job services, within a blender service, that have been implemented from the unified event transformation job interface. The offline blender service 112 may contain instances of transformation job-1 113-A, transformation job-2 113-B, transformation job-2 113-C, each of which has been implemented from a unified event transformation job interface 113. For example, transformation job-1 113-A may contain customized functions configured to receive, from data source 102, data elements for a specific trigger message type and generate new data elements formatted to conform with elements defined in the unified event format. Transformation job-2 113-B may contain customized functions configured to receive, from data source 102, data elements for a different trigger message type and generate new data elements formatted to conform with elements defined in the unified event format. Transformation job-3 113-C may contain customized functions configured to receive, from data source 104, data elements for a specific trigger message type and generate new data elements formatted to conform with elements defined in the unified event format. For example, data source 102 may send a trigger message that is formatted to provide funding information related to a company raising new funds. The funding information may contain domain specific elements formatted for conveying funding events. The transformation job-1 113-A may receive the funding information trigger message from data source 102 and implement a transform function for transforming information from the funding information specific trigger messages. The transform function may take, as input, the funding information and apply customized formatting logic, based on the configuration, to generate output that conforms with the unified event format.

In an embodiment, the offline blender service 112 generates a trigger event message for each trigger message received from data sources 102-106. The trigger event message contains data from the trigger message that has been formatted to conform with the unified event format. The offline blender service 112 routes the trigger event messages to the event processing system 120 for storage in the data repository 144. Trigger event messages for offline notifications may be stored, within persistent storage in the data repository 144, and later accessed when a notification request is sent to the notification system 130.

Near-Line Blender Service

The near-line blender service 114 may implement logic to receive trigger messages, from data sources 102-106, that have been identified as having a preferred delivery method, as near-line notification. In an embodiment, the near-line blender service 114 implements one or more customized transformation jobs specific to incoming trigger messages from data sources 102-106. For example, the near-line blender service 114 may contain one or more instances of transformation jobs that have been implemented from the unified event transformation job interface.

In an embodiment, the near-line blender service 114 generates a trigger event message for each trigger message received from data sources 102-106. The trigger event message contains data from the trigger message that has been formatted to conform with the unified event format. The near-line blender service 114 routes the trigger event messages to the event processing system 120, which may then either store the trigger event messages in the data repository 142 and/or send directly to the notification system 130. Trigger event messages for near-line notifications that have been stored, within the data repository 142, may be later accessed when a notification request is sent to the notification system 130.

Online Blender Service

The online blender service 116 may implement logic to receive, from data sources 102-106, trigger messages that have been identified as having a preferred delivery method, as online notification. In an embodiment, the online blender service 116 implements one or more customized transformation jobs specific to incoming trigger messages from data sources 102-106. For example, the online blender service 116 may contain one or more instances of transformation jobs that have been implemented from the unified event transformation job interface. In another embodiment, the online blender service 116 may implement logic to connect to data sources 102-106 and retrieve trigger message data directly from the data sources 102-106. By retrieving trigger message data from data sources 102-106, the online blender service 116 may speed up processing and generating of notification messages. For example, the online blender service 116 may schedule a retrieval job that runs every minute, or for any other scheduled frequency, to query for and pull data that would otherwise be packaged into a trigger message.

In an embodiment, transformation jobs implemented by the online blender service 116 may format data from the trigger messages into a notification-specific input format for services within the notification system 130 that generate online notification messages. Since online notifications are real-time notifications, the incoming trigger message data is formatted and directly routed from the online blender service 116 to the notification system 130.

In some embodiments, the online blender service 116 may also contain logic to generate trigger event messages labelled for routing to the event processing system 120. This may occur if the schema definitions for incoming trigger messages specify that some target user groups are to receive either near-line or offline messages. If this is the case, then the online blender service 116 generates the trigger event messages for the identified group of target users and routes the trigger event messages to the event processing system 120, which then processes the trigger event messages according to the specified delivery method.

Event Processing System

In an embodiment, the event processing system 120 implements services to receive trigger event messages, which are in the unified event format, from the blender system 110 and generate notification message requests for the notification system 130. The event processing system 120 comprises an event consumer service 122, a fanout service 124, and a recommender service 126. In an embodiment, the event consumer service 122 implements a message consumer that listens for trigger event messages from the blender system 110. In an embodiment, the event consumer service 122 stores the trigger event messages in the data repository 142. Data repository 142 may be implemented to store trigger event message types for near-line notifications. In another embodiment, the event consumer service 122 routes trigger event messages for offline notifications to the fanout service 124.

In an embodiment, the fanout service 124 analyzes a trigger event message to determine the content associated with the trigger event message and the notification type of the trigger event message. The fanout service 124 determines a set of target users for receiving a notification message of the trigger event. The set of target users may be based on the content of the trigger event and the notification type. For example, if the trigger event corresponds to a work anniversary of a source user, then the fanout service 124 may determine users connected to the source user that may be interested in knowing about the source user's work anniversary. If, however, the content of the trigger event specifies a news article about a particular company or subject matter, then the fanout service 124 may select a set of target users that are interested in topics related to the subject matter of the trigger event. For example, the fanout service 124 may determine the set of target users by selecting users that follow the subject matter or have some other connection to the subject matter, such as if the subject matter of the trigger event is the company LinkedIn, then the fanout service 124 may select users that are employees of LinkedIn.

In an embodiment, the trigger event message may contain information that specifies the set of users that should receive a notification. For example, the trigger event message may specify that only a certain subset of employees should receive an offline notification for the trigger event. This may occur if the data source 102 specifies different SLAs for different types of employees. For example, high level managers may receive online notifications of the trigger event, while regular employees are to receive offline notifications of the trigger event.

In an embodiment, upon determining the set of target users for the trigger event, the fanout service 124 may store the set of target users associated with the trigger event in the data repository 144. The data repository 144 may be implemented to store data related to offline notifications as well as user profile attributes. The user profile attributes may be accessed by the fanout service 124 and other notification services to determine recipient target users of notification messages.

In an embodiment, the recommender service 126 generates a notification request and sends the request to the notification system 130. The recommender service 126, upon determining that a notification request should be generated, retrieves data from the data repository 142 and/or 144 and generates the notification request for the notification system 130. For example, the recommender service 126 may determine that a near-line notification request for a trigger event is to be generated. The recommender service 126 retrieves the record from the data repository 142 that corresponds to the trigger event and generates a near-line notification request. The near-line notification request may include the trigger event content and any other decoration content needed to generate the notification message. In an embodiment, the notification system 130 may include fanout logic to determine the set of target users who are to receive the corresponding notification message.

In another embodiment, if the recommender service 126 determines that an offline notification message is to be generated, then the recommender service 126 retrieves the corresponding records from the data repository 144, which stores notification message information for offline messages. The corresponding records may include the trigger event content, any other decoration content needed to generate the notification message, and a set of target users already determined by the fanout service 124.

Notification System

In an embodiment, the notification system 130 generates notification messages for users and sends the notification messages to client devices 152-156 for corresponding users. The client devices 152-156 may represent computing devices including, but not limited to, desktop computers, laptop computers, tablet computers, wearable devices, video game consoles, and smartphones. Client devices 152-156 may represent devices users may use to receive notifications and initiate new user sessions.

The notification system 130 may receive a request to generate notifications for users, from either the blender system 110 or the event processing system 120. The notification system 130 contains multiple different notification services, each implemented to generate and deliver different types of notification messages depending on the requested SLA, where the SLA specifies a response time for delivery. In an embodiment, the notification system 130 comprises an offline notification service 132, a near-line notification service 134, and an online notification service 136. The offline notification service 132 receives requests to generate offline notifications. The near-line notification service 134 receives requests to generate near-line notifications. The online notification service 132 receives requests to generate online notifications.

In an embodiment, the offline notification service 132 receives notification requests from the fanout service 124 of the event processing system 120. The notification requests specify the set of target users, content for the notification message that is based on the trigger event, and any other notification message content, such as headline information and/or any other rendering information for rendering the notification messages.

In an embodiment, the near-line notification service 134 receives notification requests from the recommender service 126 of the event processing system 120. The notification request may include content from a trigger event and a notification type. The notification type may be used by the near-line notification service 134 to determine the set of target users. The near-line notification service 134 may communicate with the data repository 144 to retrieve a list of target users that match the target user criteria specified by the notification type. For example, the notification type may specify that all employees of company A are to receive the notification. The near-line notification service 134 may query user profiles in the data repository 144, which contains employer/employee information, to determine which users are employees of company A. Once the set of target users is determined, the near-line notification service 134 may generate a notification message for each of the target users and send the notification messages to client devices 152-156 corresponding to the target users.

In an embodiment, the online notification service 136 receives notification requests from the online blender service 116 of the blender system 110. The online blender service 116 sends a notification request that contains trigger event information that has been formatted for the online notification service 136. For example, if the online notification service 136 is configured to receive trigger event information in a JSON format with a specified set of elements, then the online blender service 116 formats the data message from the data source 106 into JSON with the specified set of elements. The trigger event information may specify a notification type that indicates which type of users are to receive the notification message. For example, the notification type may specify that all users that follow company A are to receive the notification. The online notification service 136 may query user profiles in the data repository 144, which contains information about companies and users that follow specific companies, to determine which users follow company A. Once the set of target users is determined, the online notification service 136 may generate a notification message for each of the target users and send the notification messages to client devices 152-156 corresponding to the target users.

Processing Overview

Figure 3:
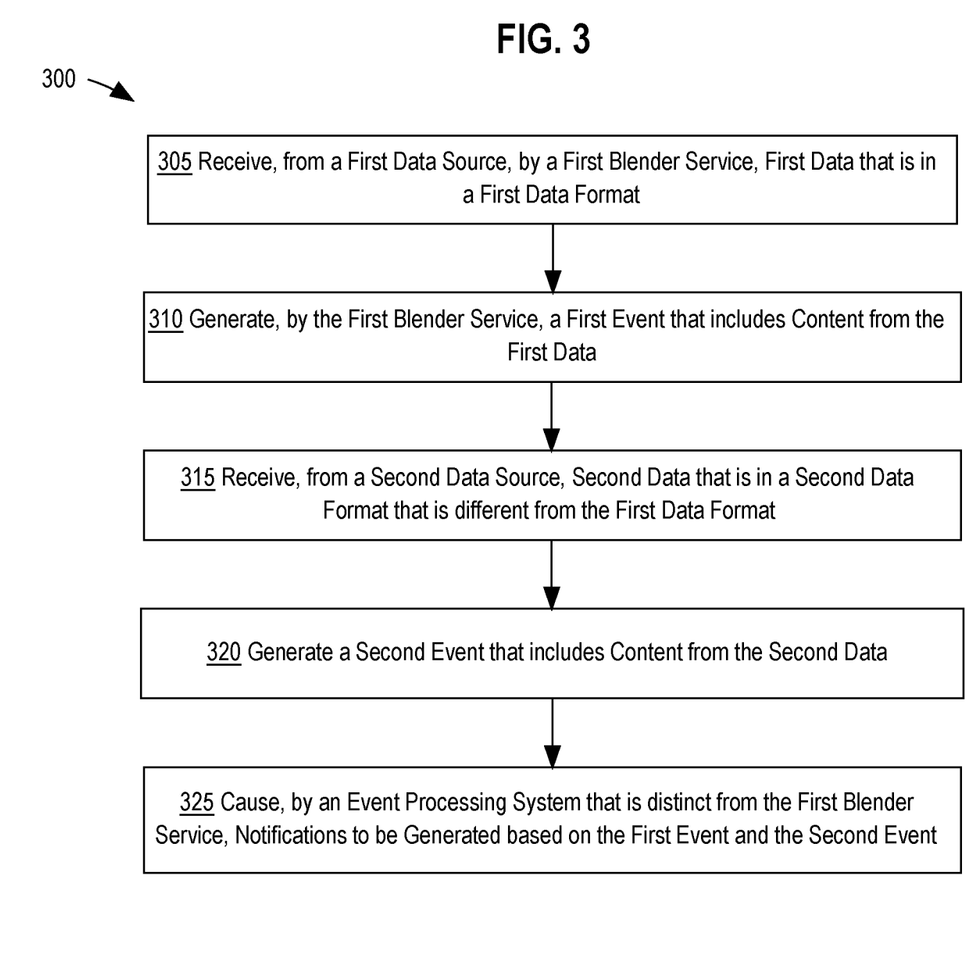
FIG. 3 depicts an example flowchart for receiving data from data sources, determining an offline and/or near-line notification delivery method and generating notification messages based on the received data, in an embodiment.

FIG. 3 depicts an example flowchart for receiving data from data sources, determining an offline and/or near-line notification delivery method and generating notification messages based on the received data. Process 300 may be performed by a single program of multiple programs. The operations of the process as shown in FIG. 3 may be implemented using processor-executable instructions that are stored in computer memory. For purposes of providing a clear example, the operations of FIG. 3 are described as performed by components of system 100. For the purposes of clarity process 300 is described in terms of a single entity.

In operation 305, process 300 receives, from a first data source, by a first blender service, first data that is in a first data format. In an embodiment, the blender system 110 receives a first trigger message, from data source 102, where elements within the trigger message are formatted specific to data source 102. The first blender service may represent either the offline blender service 112 or the near-line blender service 114. The blender system 110 may determine whether the trigger message type, for the first trigger message, specifies that either an offline notification message or a near-line notification message is to be generated. If an offline notification message is to be generated, then the blender system 110 may forward the first trigger message to the offline blender service 112. If however, a near-line notification message is to be generated, then the blender system 110 may forward the first trigger message to the near-line blender service 114. In yet another example, if the first trigger message specifies that offline and near-line notification messages are to be generated, then the blender system 110 may forward the first trigger message to the near-line blender service 114 which may be implemented to generate near-line trigger event messages and offline trigger event messages.

In operation 310, process 300 generates, by the first blender service, a first event that includes content from the first data. In an embodiment, the first blender service (either the offline blender service 112 or the near-line blender service 114) generates a first trigger event message that includes the first data, which has been reformatted to conform with the unified event format. For example, if the first blender service represents the offline blender service 112, then the offline blender service 112 may use the transformation job-1 113A to generate the first trigger event message. The first trigger event message may then be sent to the event processing system 120.

In operation 315, process 300 receives, from a second data source, second data that is in a second data format. In an embodiment, the blender system 110 receives a second trigger message, from another data source such as data source 104, where elements within the second trigger message are formatted specific to data source 104. The blender system 110 may determine whether the trigger message type, for the second trigger message, specifies that either an offline notification message or a near-line notification message is to be generated. For example, if the second trigger message specifies that a near-line notification message is to be generated, then the blender system 110 forwards the message to the near-line blender service 114.

In operation 320, process 300 generates, a second event that includes content from the second data. In an embodiment, either the offline blender service 112 or the near-line blender service 114 generates a second trigger event message that includes the second data, which has been reformatted to conform with the unified event format. For example, if the blender system 110 forwards the second data to the near-line blender service 114, then the near-line blender service 114 may use a transformation job to generate the second trigger event message. The second trigger event message may then be sent to the event processing system 120.

In operation 325, process 300 causes, by an event processing system that is distinct from the first blender service, notifications to be generated based on the first event and the second event. In an embodiment, the event processing system may represent the event processing system 120. The event processing system 120 may receive, from the services in the blender system 110, the first trigger event and the second trigger event. Each of the received trigger event messages may contain elements specifying the corresponding trigger event type, such as offline or near-line. The consumer event service 122, within the event processing system 120, may receive the first and second trigger event messages and route each of the trigger event messages to the appropriate destination. For example, if the trigger event messages are offline notification types, then the consumer event service 122 may route the trigger event messages to the fanout service 124. If, however, the trigger event messages are near-line notification types, then the consumer event service 122 may route the trigger event messages to the recommender service 126 and may store the trigger event messages in the data repository 142.

In an embodiment, if the trigger event messages, such as the first trigger event message, specifies that an offline notification message is to be generated, then the fanout service 124 may receive the first trigger event message and determine a set of target users for the first trigger event message. For example, the fanout service 124 may query user profile attributes in the data repository 144 to determine the set of users that match the notification criteria specified in the first trigger event message. For instance, the first trigger event message may specify that users who are connected to user Jane Doe are to receive a notification based on the first trigger event message. The fanout service 124 may then generate first notification records containing a target user from the set of target users, notification data from the first trigger event message, and other associated content needed to generate a notification message. Upon generating the records, the fanout service 124 may store the generated first notification records in the data repository 144. Storing notification records in the data repository 144 are not limited to only first trigger event messages. The fanout service 124 may also generate and store second notification records based on the second trigger event message, provided that the second trigger event message specifies generating an offline notification message.

Offline notification messages may be scheduled for delivery at a specific date and time. For example, if the offline notification is for user Jane Doe's birthday, then the offline notification messages may be scheduled to be delivered in the morning on Jane Doe's birthday. In an embodiment, the recommender service 126 may, at a scheduled time, retrieve, from the data repository 144, the first notification records and generate a notification request for the notification system 130. The recommender service 126 may format the data from the first notification records to conform with the specific notification service that is to generate the notification messages. For example, the first notification records specify that offline notification messages are to be generated. The recommender service 126 may format the data from the first notification records such that the request specifies each of the target user recipients of the notification message, the notification content, and a notification time for delivery. The recommender service 126 may then send the offline notification request to the offline notification service 132. In an embodiment, if the second notification records, corresponding to the second trigger event message, are also scheduled for offline notification delivery, then recommender service 126 may retrieve the second notification records, generate a second notification request, and send the second notification request to the offline notification service 132.

In an embodiment, the offline notification service 132 may receive the offline notification request, for the first trigger event message and/or the second trigger event message, from the recommender service 126 and generate the offline notification messages for each of the target users. The offline notification service 132 may send the offline notifications to client devices 152-156, which represent devices of the target users.

In an embodiment, if the trigger event messages, specify that near-line notification messages are to be generated, then the event consumer service 122 may store the trigger event messages in the data repository 142 and subsequently send the trigger event messages to the recommender service 126. Trigger event messages for near-line notifications may be stored in the data repository 142 for the purposes of preserving the events. If a failure occurs in generating the near-line notifications, then the recommender service 126 may retrieve the trigger event messages again and generate the notification requests for the trigger event messages. In another example, the event consumer service 122 may store the trigger event messages in the data repository 142 without subsequently sending the trigger event messages to the recommender service 126. This may occur if the near-line notifications are to be sent after a delayed period of time.

The recommender service 126 may receive the first trigger event message and/or the second trigger event message and generate near-line notification requests, and send the near-line notification requests to the near-line notification service 134. In an embodiment, the near-line notification service 134 may receive the near-line notification requests, for the first trigger event message and/or the second trigger event message, from the recommender service 126. The near-line notification service 134 may generate the near-line notification messages by querying the data repository 144 for a set of the target users that are to receive the notifications. The near-line notification service 134 may then generate the notification messages for each of the identified target users and may send the near-line notification messages to client devices 152-156, which represent devices of the target users.

Figure 4:
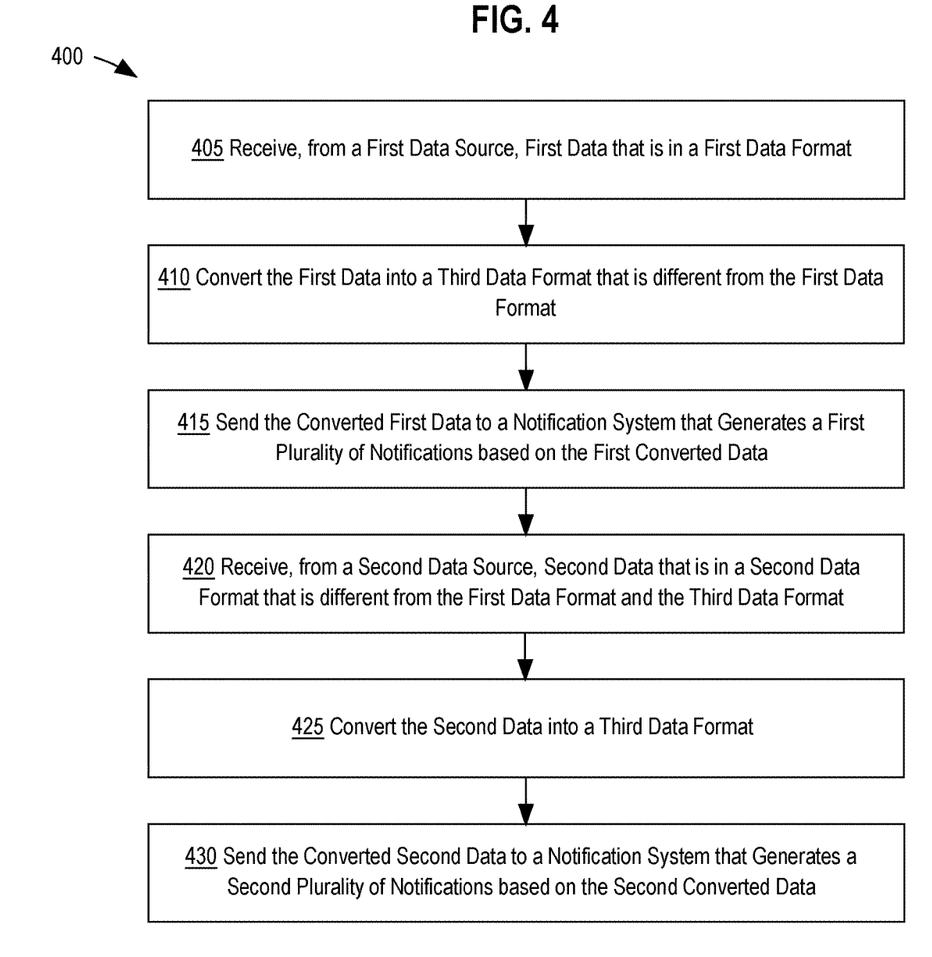
FIG. 4 depicts an example flowchart for receiving data from data sources, determining an online notification delivery method and generating notification messages based on the received data, in an embodiment.

FIG. 4 depicts an example flowchart for receiving data from data sources, determining an online notification delivery method and generating notification messages based on the received data. Process 400 may be performed by a single program of multiple programs. The operations of the process as shown in FIG. 4 may be implemented using processor-executable instructions that are stored in computer memory. For purposes of providing a clear example, the operations of FIG. 4 are described as performed by components of system 100. For the purposes of clarity process 400 is described in terms of a single entity.

In operation 405, process 400 receives, from a first data source, first data that is in a first data format. In an embodiment, the blender system 110 receives a first trigger message, from data source 106, where elements within the trigger message are formatted specific to data source 106. The blender system 110 may determine that the trigger message type, for the first trigger message, specifies that an online notification message is to be generated. The blender system 110 may then forward the first trigger message to the online blender service 116.

In operation 410, process 400 converts the first data into a third data format that is different from the first data format. In an embodiment, the online blender service 116 implements a transformation job that reads the received trigger message and converts elements from the trigger message into a format that is compatible with the online notification service 136 of the notification system 130.

In operation 415, process 400 sends the converted first data to the notification system that generates a first plurality of notifications based on the first converted data. In an embodiment, the online blender service 116 sends a notification generation request to the notification generation service 136, where the notification generation request contains converted data from the first trigger message.

In an embodiment, the online notification service 136 generates the online notification messages by querying the data repository 144 for a set of the target users that are to receive the notifications. The online notification service 136 may then generate the notification messages for each of the identified target users and may send the online notification messages to client devices 152-156, which represent devices of the target users.

In operation 420, process 400 receives, from a second data source, second data that is in a second data format, where the second data format is different from the first data format and the third data format. For example, the blender system 110 receives a second trigger message, from a different data source, such as data source 104, where elements within the second trigger message is formatted based on a schema that is different from the first trigger message. In another embodiment, the data source may be the same data source as in operation 405 but the second trigger message is in a different format than the first trigger message. For example, the data source 106 may be a news website and the first trigger message may contain information about an IPO (elements specific to IPO news). The second trigger message may contain information about company funding rounds (elements specific to funding) and may originate from data source 106. The blender system 110 may determine that the trigger message type, for the second trigger message, specifies that an online notification message is to be generated.

In operation 425, process 400 converts the second data into a third data format. In an embodiment, the online blender service 116 implements a transformation job that reads the received second trigger message and converts elements from the second trigger message into the format that is compatible with the online notification service 136, which may be the same format used in operation 410.

In an embodiment, the second trigger message may specify that a subset of target users with certain attributes are to receive near-line notification messages, another subset of target users with different attributes are to receive offline notification messages, and a third subset of users are to receive online notification messages. Operation 425 coverts the second trigger message into a format that is compatible with the online notification service 136.

As for the offline and near-line notification messages, the online blender service 116 may implement transformation jobs that input trigger messages and output trigger event messages for near-line and/or offline notifications. The trigger event messages are then sent from the online notification service 116 to the event processing system 120. The event consumer 122 may then either store the trigger event messages in data repository 142 or send the trigger event messages to the fanout service 124. Trigger event messages representing offline notifications are sent to the fanout service 124 to determine the target users and store generated notification messages in the data repository 144. Trigger event messages representing near-line notifications are stored in the data repository 142 and then subsequently sent to the recommender service 126. The recommender service 126 may generate and route notification requests to either the near-line notification service 134 or the offline notification service 132 depending on the notification type of the trigger event messages.

Referring back to FIG. 4, in operation 430, process 400 sends the converted second data to the notification system that generates a second plurality of notifications based on the second converted data. For example, the online blender service 116 sends a notification generation request to the notification generation service 136, where the notification generation request contains converted data from the second trigger message.

In an embodiment, the online notification service 136 generates the online notification messages by querying the data repository 144 for a set of the target users that are to receive the notifications. The online notification service 136 may then generate the notification messages for each of the identified target users and may send the online notification messages to client devices 152-156, which represent devices of the target users.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
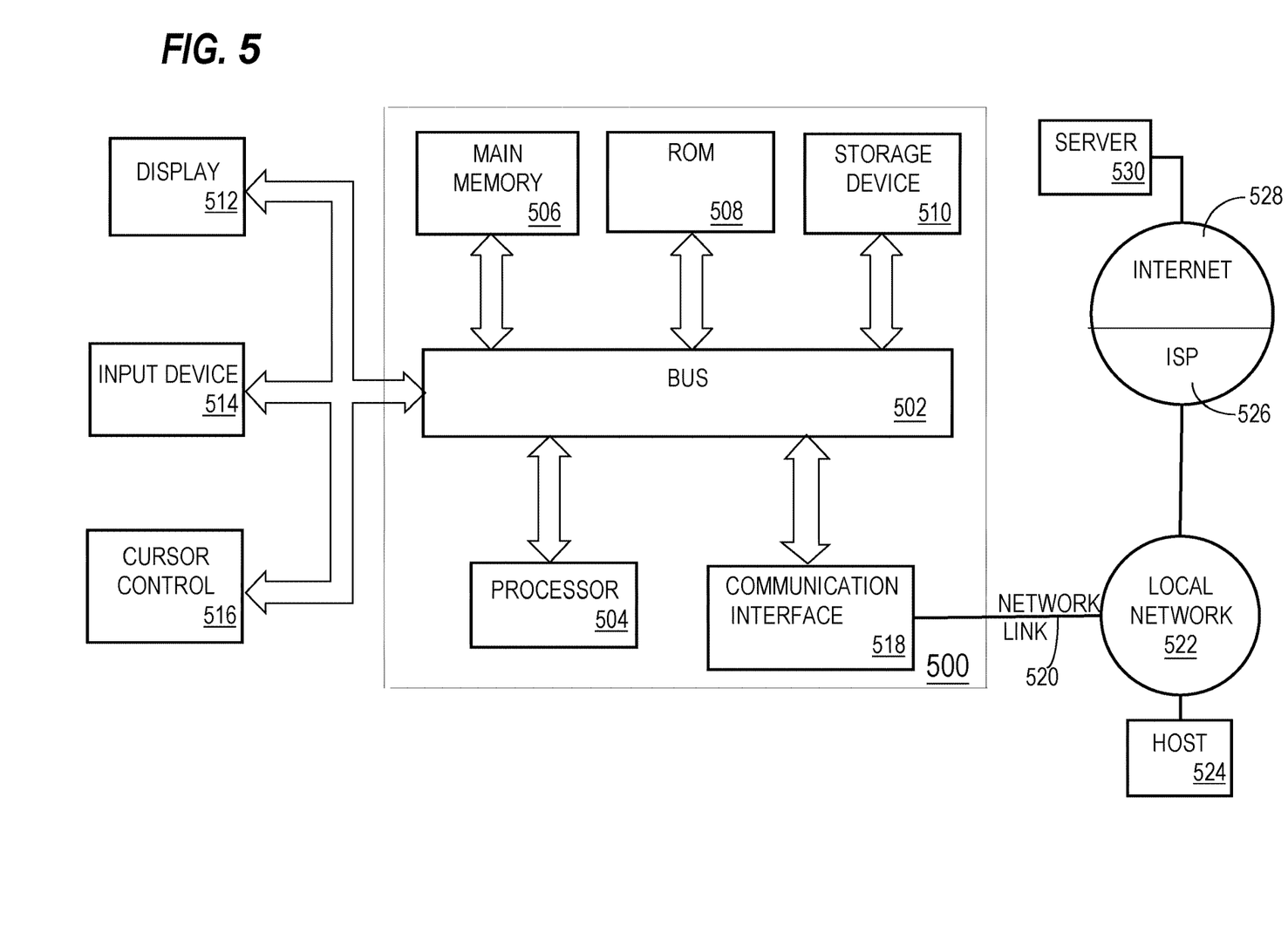
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving, from a first data source, by a first blender service, first data that is in a first data format;
based on the first data, generating, by the first blender service, a first event that includes content from the first data;
receiving, from a second data source, second data that is in a second data format that is different from the first data format;
based on the second data, generating a second event that includes content from the second data;
causing, by an event processing system that is distinct from the first blender service, notifications to be generated based on the first event and the second event;
wherein causing the notifications to be generated based on the first event and the second event, comprises:
receiving, by a consumer of the event processing system, the first event and the second event, and
sending, by the event processing system to a notification system, one or more requests to generate one or more first notifications based on the first event and one or more second notifications based on the second event and
wherein sending the one or more requests to generate the one or more first notifications based on the first event and the one or more second notifications based on the second event, comprises:
determining, by the event processing system, that the first event is of a first event type and the second event is of a second event type, wherein the first event type and the second event type are different event types;
sending, by the event processing system to an offline notification service of the notification system, a first request to generate the one or more first notifications for delivery to a first set of users, and
sending, by the event processing system to a near-line notification service of the notification system, a second request to generate the one or more second notifications for delivery to a second set of users;
wherein the method is performed by one or more computing devices.

2. The method of claim 1, further comprising:
upon generating the first event that includes content from the first data, storing, in persistent storage, the first event; and
upon generating the second event that includes content from the second data, storing, in persistent storage, the second event.

3. The method of claim 2, wherein causing the notifications to be generated based on the first event and the second event, comprises:
retrieving, by the event processing system, from the persistent storage, the first event and the second event; and
sending, by the event processing system to a notification system, one or more requests to generate one or more first notifications based on the first event and one or more second notifications based on the second event.

4. The method of claim 1, wherein:
the offline notification service implements a first notification delivery service-level agreement type; and
the near-line notification service implements a second notification delivery service-level agreement type that is different from the first notification delivery service-level agreement type.

5. The method of claim 1, wherein a second blender service that is different than the first blender service performs the receiving of the second data and the generating of the second event.

6. A method comprising:
receiving, from a first data source, first data that is in a first data format;
converting the first data into a third data format that is different from the first data format;
sending the converted first data to a notification system that generates a first plurality of notifications based on the first converted data;

receiving, from a second data source, second data that is in a second data format that is different from the first data format and the third data format;

converting the second data into the third data format;

sending the converted second data to the notification system that generates a second plurality of notifications based on the second converted data;

based on the first data, generating a first event that includes content from the first data source, wherein the first event is directed to a first type of user;

causing, by an event processing system, first-type notifications to be generated based on the first event, wherein the first-type notifications are to be delivered to a first set of users that are of the first type of user;

based on the first data, generating a second event that includes content from the first data source, wherein the second event is directed to a second type of user that is different than the first type of user; and causing, by the event processing system, second-type notifications to be generated based on the second event, wherein the second-type notifications are to be delivered to a second set of users that are of the second type of user;

wherein the method if performed by one or more computing devices.

7. The method of claim 6, further comprising:

sending the first event to the event processing system; and storing, by the event processing system, in persistent storage, the first event.

8. The method of claim 6, wherein the first-type notifications are generated by an offline notification service of the notification system, and wherein offline notification service implements a first notification delivery service-level agreement type.

9. The method of claim 6, wherein the second-type notifications are generated by a near-line notification service of the notification system, and wherein near-line notification service implements a second notification delivery service-level agreement type.

10. A computer program product comprising:

one or more non-transitory computer-readable storage media comprising instructions which, when executed by one or more processors, cause:

receiving, from a first data source, by a first blender service, first data that is in a first data format;

based on the first data, generating, by the first blender service, a first event that includes content from the first data;

receiving, from a second data source, second data that is in a second data format that is different from the first data format;

based on the second data, generating a second event that includes content from the second data;

causing, by an event processing system that is distinct from the first blender service, notifications to be generated based on the first event and the second event;

wherein causing the notifications to be generated based on the first event and the second event, comprises:

receiving, by a consumer of the event processing system, the first event and the second event, and sending, by the event processing system to a notification system, one or more requests to generate one or more first notifications based on the first event and one or more second notifications based on the second event; and wherein sending the one or more requests to generate the one or more first notifications based on the first event and the one or more second notifications based on the second event, comprises:

determining, by the event processing system, that the first event is of a first event type and the second event is of a second event type, wherein the first event type and the second event type are different event types;

sending, by the event processing system to an offline notification service of the notification system, a first request to generate the one or more first notifications for delivery to a first set of users, and sending, by the event processing system to a near-line notification service of the notification system, a second request to generate the one or more second notifications for delivery to a second set of users.

11. The computer-program product of claim 10, wherein the one or more non-transitory computer-readable storage media comprises further instructions which, when executed by the one or more processors, cause:

upon generating the first event that includes content from the first data, storing, in persistent storage, the first event; and upon generating the second event that includes content from the second data, storing, in persistent storage, the second event.

12. The computer-program product of claim 11, wherein causing the notifications to be generated based on the first event and the second event, comprises:

retrieving, by the event processing system, from the persistent storage, the first event and the second event; and sending, by the event processing system to a notification system, one or more requests to generate one or more first notifications based on the first event and one or more second notifications based on the second event.

13. The computer-program product of claim 10, wherein:

the offline notification service implements a first notification delivery service-level agreement type; and the near-line notification service implements a second notification delivery service-level agreement type that is different from the first notification delivery service-level agreement type.

14. The computer-program product of claim 10, wherein a second blender service that is different than the first blender service performs the receiving of the second data and the generating of the second event.

* * * * *